United States Patent
Knight et al.

(10) Patent No.: US 9,218,029 B2
(45) Date of Patent: Dec. 22, 2015

(54) METHOD AND SYSTEM FOR RESETTING A SOC

(71) Applicant: Infineon Technologies AG, Neubiberg (DE)

(72) Inventors: Richard Knight, Stroud (GB); Tim Weyland, Merching (DE); Juergen Karmann, Otterfing (DE)

(73) Assignee: Infineon Technologies AG, Neubiberg (DE)

( * ) Notice: Subject to any disclaimer, the term of this patent is extended or adjusted under 35 U.S.C. 154(b) by 555 days.

(21) Appl. No.: 13/656,784

(22) Filed: Oct. 22, 2012

(65) Prior Publication Data
US 2014/0115307 A1    Apr. 24, 2014

(51) Int. Cl.
*G06F 1/24* (2006.01)

(52) U.S. Cl.
CPC ...................... *G06F 1/24* (2013.01)

(58) Field of Classification Search
CPC ........................................ G06F 1/24
See application file for complete search history.

(56) References Cited

U.S. PATENT DOCUMENTS

| | | | | |
|---|---|---|---|---|
| 5,680,599 A * | 10/1997 | Jaggar | ............. | 712/244 |
| 5,758,170 A * | 5/1998 | Woodward et al. | ............ | 710/267 |
| 6,061,803 A * | 5/2000 | Ayache | ............ | 713/501 |
| 6,108,778 A * | 8/2000 | LaBerge | ............ | 713/1 |
| 6,400,195 B1 * | 6/2002 | Bhaskaran | ............ | 327/142 |
| 7,348,815 B2 * | 3/2008 | Chou | ............ | 327/142 |
| 2013/0227257 A1 * | 8/2013 | Singh et al. | ............ | 713/1 |

* cited by examiner

*Primary Examiner* — Stefan Stoynov
(74) *Attorney, Agent, or Firm* — Eschweiler & Associates, LLC

(57) ABSTRACT

A method for resetting a so-called System on Chip SoC is described as well as a system adapted and configured to perform the method. A reset signal applied to the SoC resets the system but at the same time prevents loss and corruption of data that was processed at the time of signal application.

22 Claims, 2 Drawing Sheets

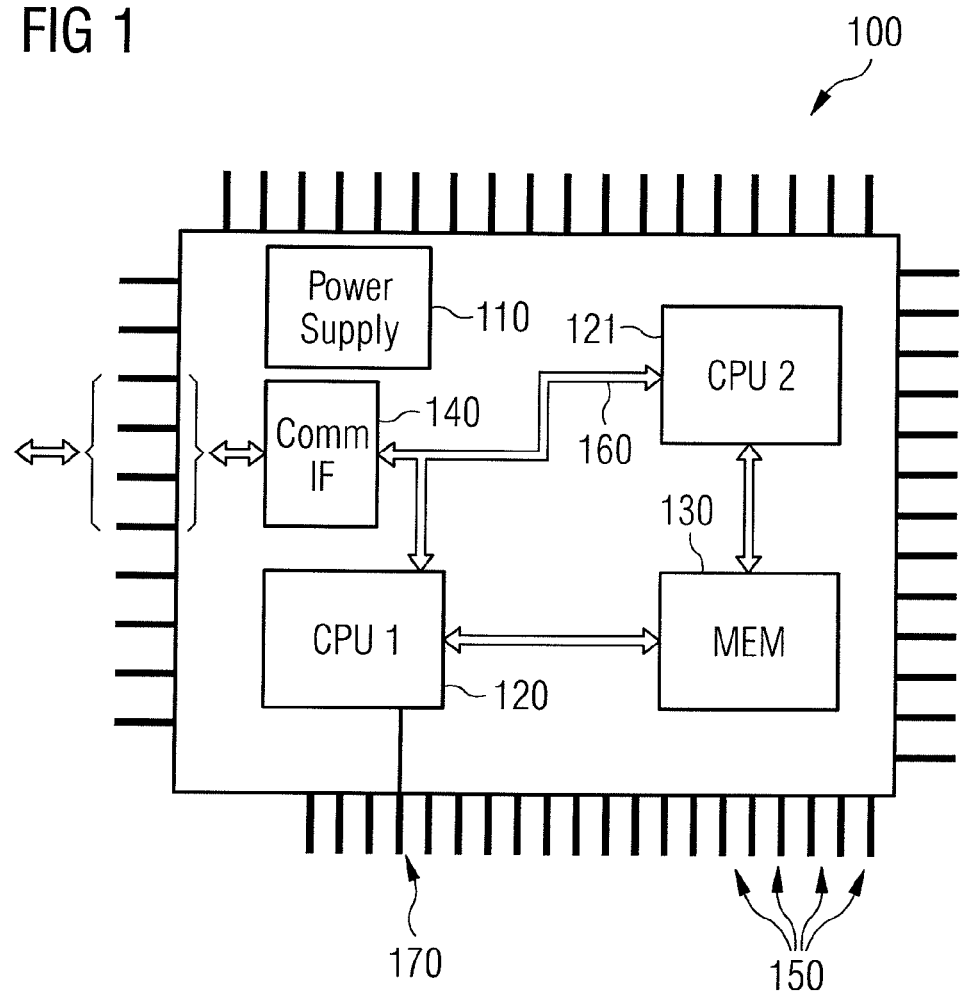

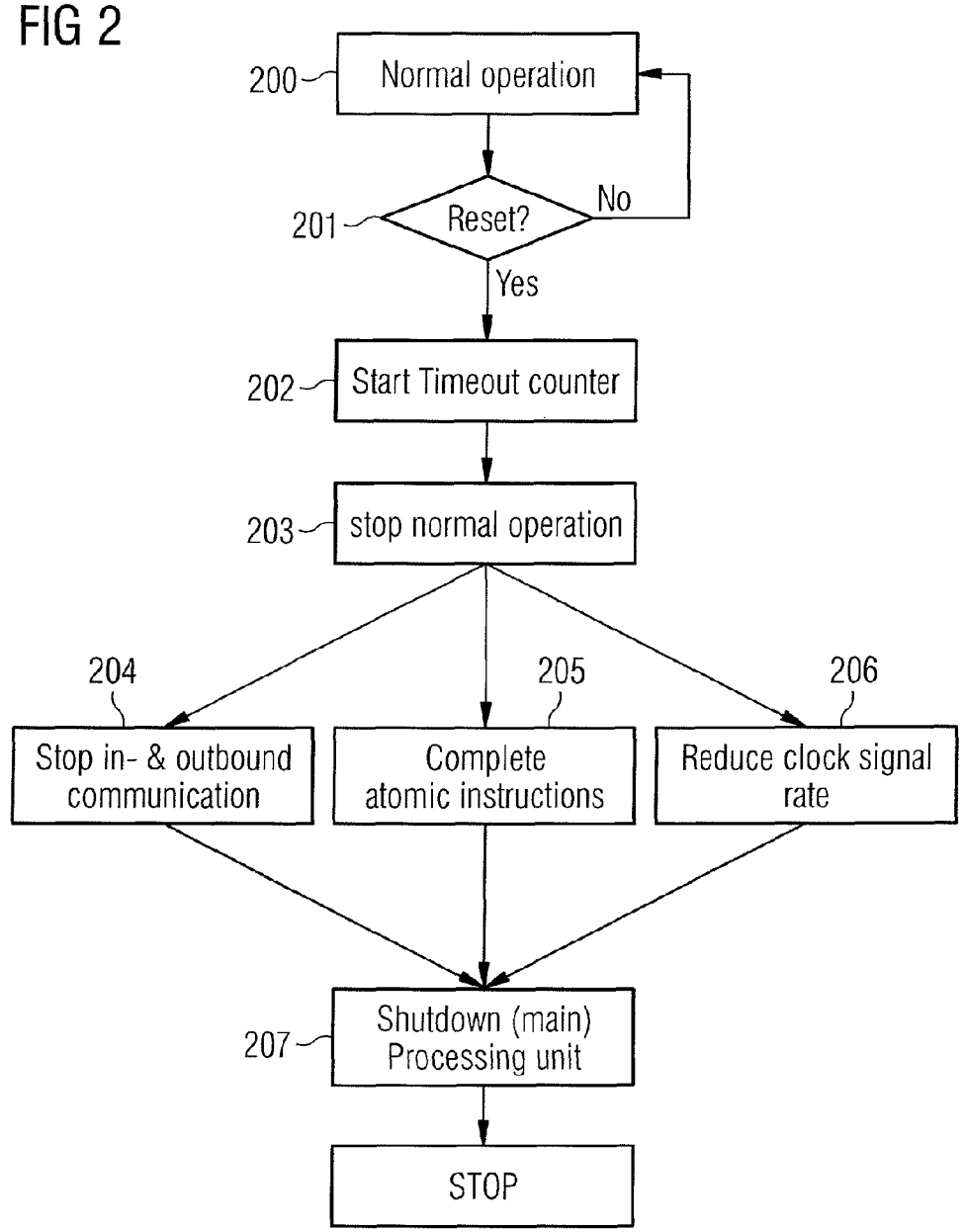

METHOD AND SYSTEM FOR RESETTING A SOC

FIELD

This invention relates to a method for resetting a so-called system on chip (SoC) and a system on chip adapted and configured for performing the method.

BACKGROUND

A so-called system on chip, or system on a chip, typically abbreviated SoC, is an integrated circuit (IC) that integrates all components of an electronic system into a single chip. The components comprised in the SoC in this way form an operational system that may replace an arrangement of a plurality of separate components.

The SoC may comprise one or more digital signal processors, also called cores or central processing units that are capable of executing sequences of instructions to process digital data. Accordingly the SoC may comprise memory for storing digital information, wherein the memory may be volatile or non-volatile and wherein the digital information may comprise code executable by a digital signal processor. To enable access to the memory the comprised cores may be communicatively coupled to the memory, for example, by a bus system, which may couple to further comprised components. Furthermore the SoC may comprise a power supply that provides supply voltages for the comprised components and a timing unit that provides a clock signal for components. Also the SoC may comprise at least one interface for communicatively coupling the SoC to another system for information exchange, wherein the at least one interface may be analogue or digital.

The SoC typically exhibits a plurality of pins for supplying power to the SoC and connecting to peripheral systems, wherein the pins may be arbitrarily implemented, i.e. for example as a ball grid array.

In order to enable to set the system into a defined condition the system provides a so-called reset function, which can be triggered by various events. The reset function can be implemented as a software command to be provided via a communication line. Alternatively one or more of the pins are so-called reset-pins. Upon application of a predefined signal, i.e. typically a voltage level, the system can be set to a predefined condition, wherein the reset action typically stops all processing actions performed in and by the SoC.

While a reset event can be triggered as part of starting the system, i.e. to bring the system into a predefined condition when initially powering up the system, reset events may also occur while the system has been running for a while.

This sudden stop of all processing actions may cause problems, particularly when the reset signal is applied not as part of a startup sequence but during normal operation of the SoC.

If system context, i.e. information reflecting the current processing context of the SoC, or trace information, i.e. information reflecting currently processed information, is stored into memory, i.e. particularly into memory comprised in the SoC itself, then this data may be corrupted by the reset event since the system might stop operating when performing the steps of writing the information. Even if the reset event/signal occurs synchronous with a clock signal it is possible that a write action may be corrupted since the write action may span several clock cycles for writing a data block. Thus that data block may be stored incomplete, i.e. corrupted. In case the system is subsequently fully restarted, i.e. any data written during a previous operation are ignored, then this problem is of minor importance. However, in case the SoC takes the incompletely stored data into account upon restart, for example in order to accelerate the restart process and to restore the previous operational context, then these final data writes may be significant.

Another problem may arise in case there are multiple simultaneous data writes in progress to different memories, i.e. different and non-synchronized memory entities. In that case it is desirable that the stored data is consistent and coherent across these memories. For example, if a so-called debug-trace is running, i.e. runtime data reflecting the instruction trace information and the processed in- and output data are stored to memory for monitoring the operation of the SoC, then it is also desirable that any store operations, which have been traced, can be matched to real write data in the memory. In case of an unexpected reset event, which abruptly stops all activities of the SoC, these data may be stored inconsistent and corrupted thus leaving the latest operations being untraced.

Another problem can arise from the power supply components comprised in the SoC. If the SoC is powered from a voltage regulator, which typically is the case, then the regulator will see a sudden rapid stop in load when a reset event triggers all components to immediately stop operating. This sudden drop of electric load in the supply circuitry can cause an voltage overshoot or voltage spike which in turn may cause malfunction or even damage at the time of reset or restart. This problem could be handled by a more flexible and stable voltage regulator, wherein a typical solution requires usage of a larger capacitance for smoothing the output voltage, but wherein a larger capacitance, i.e. a larger analogue component, is not desirable and costly in a system implemented on a single chip.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated, as they become better understood by reference to the following detailed description.

FIG. 1 depicts a schematic of a System on Chip (SoC);

FIG. 2 depicts a flowchart of a method for resetting a SoC.

DETAILED DESCRIPTION

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present invention. The following detailed description, therefore, is not to be taken in a limiting sense, and the scope of the present invention is defined by the appended claims.

FIG. 1 depicts a schematic of a so-called System on Chip (SoC) 100. The SoC may integrate on one chip a power supply 110, first and second digital signal processors 120, 121, i.e. central processing units or processing cores 120,121, at least one memory 130 and at least one communication interface 140. Note that the system shall not be limited in this regard, i.e. the SoC may comprise fewer or more and different functional blocks than depicted in the figure. Also note that FIG. 1 omits all internal wiring of the SoC in order to not unnecessarily obscure the invention.

For connecting SoC 100 to peripheral devices, the SoC exhibits a plurality of electrical contacts, which may come as pins 150 or in a so-called ball point array.

The SoC may be manufactured using MOS technology or bipolar technology or a mixture thereof and may furthermore comprise analogue components as well. In this regard the invention shall not be limited to a particular kind of manufacturing.

Power supply 110 is adapted and configured to provide voltages to the components integrated in the SoC. Accordingly the power supply is electrically coupled to the respective functional components comprised in the SoC. In turn power supply 110 is coupled to a subset of contacts 150 for receiving electrical power.

To enable communication with peripheral devices, which are not comprised in the SoC and which are not shown in the figure, the SoC may comprise at least one communication interface 140. The communication interface may be implemented as software executed by a processor unit comprised in the SoC or as a separate functional block, which is coupled to other functional blocks by a communication system internal to the SoC. Communication interface 140 may be coupled via at least one contact 150 to peripheral devices. Interface 140 may implement any known serial or parallel standard communication protocol, or any communication protocol proprietary to the manufacturer. Note that the SoC may comprise a plurality of communication interfaces each implementing a different communication protocol to enable communication using different protocols.

For processing data, either data retrieved via a communication interface 140 or any data generated internally, the SoC may comprise at least one central processing unit 120, abbreviated CPU1. Optionally the SoC may comprise further CPUs 121 for processing data, wherein each CPU may be communicatively coupled to each other functional component integrated in the SoC.

The coupling between the CPUs 120, 121 and any functional blocks comprised in the SoC may be achieved by any arbitrary communication device 160 comprised in the SoC. The internal communication device 160 may be a bus system that interconnects functional blocks comprised in the SoC, wherein the device 160 may enable communication by implementing any arbitrary communication protocol suitable for internal SoC communication.

Furthermore the SoC may comprise memory block 130. Memory 130 may comprise volatile memory for internal buffering of data and non-volatile memory for permanently storing data. In particular the non-volatile memory may store executable program code for being executed by at least one of the CPUs 120, 121. Accordingly memory 130 may be communicatively coupled to at least one of the CPUs 120, 130.

For applying a reset signal the SoC comprises at least one reset means 170, which in one embodiment can be implemented as a pin or contact 150 that is used as reset means only, and which can be directly coupled to one of the processing units 120, 121. In an alternative embodiment the reset means can be implemented by any communication interface 140 comprised in the SoC, wherein the communication interface passes a corresponding inbound communication to one of the processing units 120, 121 for further processing of the reset signal or reset command.

In order to not unnecessarily confuse the description of the process of resetting the SoC, we assume in the following that the system exhibits a dedicated reset pin directly coupled to central processing unit 120. Processing unit 120 may detect an application of a reset signal as a rising or falling edge of the voltage applied to the reset pin. During normal operation of the SoC the voltage applied to the reset pin may equal a supply voltage, wherein the SoC detects a reset signal if the applied voltage is shortcut to reference ground. However, the invention may not be limited in this regard, i.e. the behavior of the SoC may be identical to the behavior when detecting a reset via a dedicated reset pin in case the processing unit detects a reset signal as a reset command transmitted via communication bus 160.

When processing unit 120 detects a reset request, from the user perspective it is desirable that the SoC appears to be reset immediately. Correspondingly the SoC's pins should immediately assume a reset state and all processing units 120, 121 should stop execution of the currently executed application in order to signal to the peripheral components of the SoC, particularly to the pins providing signals to the peripheral components, that the SoC has stopped execution of the application.

The steps performed by SoC 100 upon detection of a reset signal are described in the following with reference to FIG. 2, which illustrates the internal operation of the SoC by way of a flow chart.

The method starts at 200 while the SoC operates normally wherein normal operation shall mean that the SoC executes the application as programmed and a reset signal is not applied to the system. While the SoC operates normally, i.e. without having detected a reset signal, the SoC checks on a regular basis at 201 whether a reset signal has been applied to the SoC. In one embodiment this can be achieved by checking the signal status of the reset pin, i.e. by checking the voltage applied to the reset pin. Alternatively a signal change applied to the reset pin may be processed as an interrupt that triggers the execution of a particular sequence of predefined operations that can be considered a small state machine. As illustrated by the NO path, the SoC continues its normal operation at 200 as long as a reset signal is not detected.

In case the SoC comprises more than one processing unit 120, 121 the reset pin may be applied to all processing units, so that each of the processing units 120, 121 processes the reset signal separately. Accordingly the actions described hereinafter are valid for all processing units comprised in the SoC, i.e. the sequence of processing steps is applied to all of the processing units where applicable. In an alternative embodiment one of the at least two processing units 120, 121 may be configured as a controller for other processing units. That controlling processing unit accordingly is configured as a main processing unit and communicatively coupled to the other processing units to control execution of the sequence of processing steps described hereinafter.

Optionally and at the beginning of the sequence of actions performed upon detection of a reset signal a timeout counter may be started in the main processing unit at 202. During processing the actions for resetting the SoC, the main central processing unit checks if the timeout counter has expired. In case the timeout counter has expired while processing the described actions the main processing unit shortcuts all that processing and immediately shuts down all functional blocks regardless of the current state of the SoC in order to enforce the reset within a predefined time limit. Otherwise, if the timeout counter has not expired, the SoC continues to perform the described actions for reset. Note that the timeout counter may be implemented as a counter that may count clock ticks or fractions of seconds or the like, and which checks on a regular basis whether the timeout counter has expired.

Subsequently or in case that a timeout counter is not used, operation of the SoC proceeds at 203, i.e. the SoC stops its normal operation, without abruptly stopping all internal operation. Stopping normal operation shall mean here that all processing units 120, 121 comprised in the SoC stop execution of the currently processed applications. As a consequence inbound information is no longer processed and outbound communication stops immediately. In this respect the reset signal may be communicated to all communication interfaces receiving inbound communication so that these are instructed to no longer accept incoming data. In a particular embodiment the communication interfaces 140 may just stop forwarding incoming data to functional blocks comprised in the SoC and also stop acknowledging reception of information to any transceivers located outside the SoC. In this way the communication interfaces immediately stop all data reception activities having impact to peripheral devices of the SoC. However, in case a communication interface is passing received data via internal communication device 160, i.e. for example an internal communication bus, to a functional block within the SoC, the interface may complete that internal data transmission in order to prevent the internal communication device or any functional block from being blocked by a corrupted data transmission.

Similarly, communication interfaces, when receiving the reset signal notification, in one embodiment may immediately stop transmission of any outbound data, even during transmission of a packet thus corrupting that outbound transmission of a packet or burst of data, at 204. Although this sudden stop of a transmission may not be advisable for all peripheral bus systems, it is one possibility to terminate outbound communication in case the peripheral bus system uses a robust communication protocol. In this way the communication interfaces immediately obey the application of the reset signal.

In an alternative embodiment and depending on the communication protocol of the peripheral bus system, a communication interface 140 may complete the transmission of outbound data in order to prevent any blockage of the peripheral communication system that might be caused by transmitting incomplete, corrupted data. For example and in case the peripheral communication is a master-slave configuration, the communication interface may complete an ongoing master-slave interaction that does not allow interruption without blocking the peripheral communication partner, thus terminating the communication properly. For example, if the SoC waits for pending bus master accesses to complete then the chance of a protocol violation is minimized. Communication interface 140 may be configured and adapted to operate accordingly. In this way outbound communication is stopped as fast as possible when a reset signal is detected while at the same time preventing corruption or blockage of a connected peripheral bus system.

Furthermore a functional block comprised in the SoC may complete atomic instruction sequences at 205, in order to prevent corruption of data objects that are currently processed when the reset signal is detected in the SoC. This method act thus actually may comprise execution of a plurality of instructions namely the execution of those remaining instructions that form part of a so-called atomic instruction sequence, wherein execution of the sequence started before the reset signal was detected in the SoC. Atomic instruction sequences shall mean any sequence or set of at least two instructions executed by at least one functional block comprised in the SoC that requires complete execution of all instructions in order to prevent unrecoverable data or system corruption. Exemplifying embodiments of atomic instruction sequences may comprise storing a block of data in memory, wherein the storing may for example comprise calculation and storage of a check sum for checking integrity of the data block. In case the data block is stored without the check sum that data block is corrupted and useless. Moreover the system may not only disregard the data, but in case that data is vital for the system, the corrupted data block may block the entire SoC at the next startup of the SoC. Another atomic instruction sequence may comprise the communication between two processing units 120, 121 comprised in the SoC, wherein one processing unit 120 commands another processing unit 121 to perform a particular action and waits for an acknowledge of successful execution of that command. In case the commanded processing unit 121 is shut down without communicating an expected reply, i.e. without sending the acknowledge, the commanding processing unit will wait until a timeout expires or the SoC is powered down.

This act may involve flushing write buffers. Since these buffers typically are implemented by volatile memory, i.e. memory that loses its contents when the SoC is turned off or reset, the contents buffered therein may be written completely to non-volatile memory in order to preserve the buffered information. In one embodiment the buffered information may comprise debug trace information, which should be consistent with other data comprised in memory. The flushing of write buffers may comprise flushing the write buffer contents via an interface to peripheral memory of the SoC, which has to be completed before stopping any outbound communication via a communication interface. Alternatively the flushing of write buffers can be a store action to non-volatile memory comprised in the SoC, i.e. a write to memory 130. Note that in one embodiment the flushing of write buffers may be acknowledged by the write buffer by communicating a corresponding signal to the functional block that commanded the flush operation.

In case the SoC comprises a clock signal generator, the clock signal rate can be reduced in order to gradually reduce power consumption of the clock signal generator itself and functional blocks receiving the clock signal of the clock signal generator at 206. In one embodiment the clock signal reduction may be performed in a plurality, i.e. at least two, sequential steps, thus reducing the output clock rate of the clock signal generator in a stepwise fashion. In this way the overall power consumption of the clock signal generator and functional blocks coupled to the clock signal can be reduced, thus reducing voltage peaks resulting from shutting down functional blocks. Note that in one embodiment this act of reducing the clock rate may be performed while functional blocks are performing the actions for shutting down the SoC due to the applied reset signal, i.e. the operation of functional blocks is slowed down correspondingly. Consequently the execution of the reset procedure steps takes more time but at the same time slowly, i.e. in a stepwise manner, reduces power consumption and the risk of voltage peaks.

In case the SoC comprises a plurality of clock signal generators, each of these can be controlled to stepwise reduce the clock rate of its respective output clock signal. In one embodiment the clock signal generators are controlled one after the other to reduce the rate of the output clock signal, so that the voltage peaks caused by reducing the clock rates do not add up in one instance of time. In this way the plurality of clock signal generators sequentially can be controlled to stepwise reduce the rate of their respective output clock signals.

Note that in one embodiment the SoC may comprise a main processing unit that controls the steps described above when a reset signal is detected. The main processing unit may accordingly instruct and control the functional blocks comprised in the SoC, i.e. the main processing unit may command each functional block and check that functional block, for example, by evaluating an acknowledge message returned from a functional block. Furthermore the acts of resetting the SoC may be performed in parallel by the functional blocks. Accordingly the main processing unit may instruct functional blocks to perform the acts 204 to 206 concurrently. In an alternative embodiment the main processing unit may command the functional blocks to perform the method acts one after another.

Finally, i.e. at the end of the reset procedure at 207, the main processing unit that controlled the acts performed by other functional blocks or processing units, is shut down thus terminating the reset procedure. This act itself may comprise more than one instruction performed by the main processing unit. In one example these instructions may comprise that the main processing unit may flush all its internal write buffers to a memory in order to save the protocol of actions performed in the course of resetting the SoC. Furthermore the main processing unit may optionally signal to the peripheral of the SoC that the SoC has been reset. Note that under normal conditions this shutdown act starts before the optionally started timeout counter expires, since under normal conditions the sum of acts performed upon detection of a reset signal is completed before the timeout counter expires. Correspondingly the timeout counter may expire only in case that any of the reset acts cannot be completed in time.

In this way the reset request detected at the SoC appears to an external application or user to have immediate effect, but actually triggers an orderly shutdown of the SoC. This is achieved by bringing the SoC into a quiescent state before shutting down functional blocks. The processing of the reset in one embodiment may be implemented as a state machine that resets the SoC in a more orderly manner in order to prevent data corruption and voltage peaks when resetting the SoC that may damage the SoC. In an alternative embodiment it may be implemented as a non-maskable software routine which executes the necessary sequences to ensure an orderly shutdown of system operation before the reset occurs.

Note that the above described method can be also applied to a subset of functional blocks only that are comprised in the SoC. Accordingly the method can be applied to subsection of the SoC. A reset signal or trigger may accordingly affect only a subsection of the SoC, for example one of a plurality of CPUs and it's associated functional blocks including associated peripheral functional units.

Notwithstanding, the invention and its inventive arrangements disclosed herein may be embodied in other forms. Accordingly, reference should be made to the following claims, rather than to the foregoing specification, as indicating the scope of invention. In this regard, the description is intended by way of example only and is not intended to limit the present invention in any way.

The invention claimed is:

1. A system on a chip, comprising:
at least a first central processing unit communicatively coupled to a communication interface and to a memory internal of the system on a chip,
wherein the system on a chip is adapted and configured to stop inbound and outbound communication via respective pins of the system on a chip upon detecting of a reset signal applied to the system on a chip, while still performing a sequence of processing acts by the first central processing unit, and before shutting down the first central processing unit after detecting of the reset signal applied to the system on a chip.

2. The system on a chip of claim 1, further comprising at least one clock signal generator configured to generate a clock signal, wherein the at least one clock signal generator is coupled at least to one of the first central processing unit, the communication interface, and the memory, wherein the system is adapted and configured to reduce a clock signal rate of the clock signal generator upon detecting the reset signal.

3. The system on a chip of claim 1, further comprising at least one second central processing unit communicatively coupled to the first central processing unit, wherein the first central processing unit is configured to command the at least one second central processing upon detecting the reset signal.

4. The system on a chip of claim 1, wherein the system is adapted and configured to start a timeout counter upon detecting the reset signal, and wherein the system is adapted and configured to shut down the system when the timeout counter expires.

5. The system on chip of claim 1, wherein the system comprises a voltage controller.

6. An electric circuit, comprising:
at least one processing unit communicatively coupled to a memory and a communication interface; and
means for detecting a reset signal applied to the electric circuit, wherein the electric circuit is adapted and configured to stop inbound and outbound communication via respective pins of the electric circuit upon detecting the reset signal being applied to the electric circuit, while still performing a sequence of processing steps by the at least one processing unit upon detecting a reset signal by the detecting means applied to the electric circuit and before shutting down the at least one processing unit.

7. The electric circuit of claim 6, further comprising a clock signal generator configured to generate a clock signal, wherein the clock signal generator is coupled at least to one of the first central processing unit, the communication interface, and the memory, wherein the system is adapted and configured to reducing a clock signal rate of the clock signal generator upon detecting the reset signal.

8. The electric circuit of claim 6, further comprising a second central processing unit communicatively coupled to the first central processing, wherein the first central processing unit is configured to command the second central processing upon detecting the reset signal.

9. The electric circuit of claim 6, further comprising a timeout counter configured to initiate a counting thereof upon detecting the reset signal, and wherein the system is adapted to shutdown the system when the timeout counter expires.

10. The electric circuit of claim 6, further comprising a voltage controller.

11. A method for resetting a system on a chip comprising at least a first central processing unit communicatively coupled to a communication interface and to a memory internal to the system, the method comprising:
conducting a normal operation of the system;
upon detecting a reset signal applied to the system, starting a state machine in the system to reset the system; and
stopping inbound and outbound communication via respective pins of the system on a chip upon detecting the reset signal being applied to the system on a chip, while still performing a sequence of processing acts by the first central processing unit and before shutting down the first central processing unit.

12. The method of claim 11, wherein actions of the state machine in resetting the system are executed by the first central processing unit.

13. The method of claim 11, wherein resetting the system comprises the state machine starting a timeout counter.

14. The method of claim 11, wherein resetting the system comprises the state machine controlling another central processing unit by the first central processing unit.

15. The method of claim 11, wherein resetting the system comprises the state machine stopping the inbound and outbound communication.

16. The method of claim 11, wherein resetting the system comprises the state machine reducing an internal clock signal rate.

17. The method of claim 11, wherein resetting the system comprises the state machine flushing data buffers.

18. A method for resetting an electric circuit comprising at least a first central processing unit communicatively coupled to a communication interface and a memory internal of the system and a second central processing unit, said method comprising:

conducting a normal operation of the electric circuitry; and stopping, via respective pins of the electric circuit, all inbound and outbound communication associated with the electric circuit upon detecting a reset signal applied to the electric circuit while still performing a sequence of processing acts by the first central processing unit and before shutting down the first central processing unit.

19. The method of claim 18, further comprising starting a timeout counter upon detecting the reset signal applied to the electric circuit.

20. The method of claim 18, further comprising controlling the second central processing unit by the first processing unit upon detecting the reset signal applied to the electric circuit.

21. The method of claim 18, further comprising flushing internal buffers to the internal memory by the first central processing unit and the second central processing unit upon detecting the reset signal applied to the electric circuit.

22. The method of claim 18, wherein the electric circuit further comprises a clock signal generator, the method further comprising reducing the clock signal rate of the clock signal generator upon detecting the reset signal applied to the electric circuit.

* * * * *